Dec. 7, 1937.  A. J. KEENEY  2,101,714
RUBBER COATED ARTICLE AND METHOD OF MANUFACTURING SAME
Filed Feb. 15, 1935
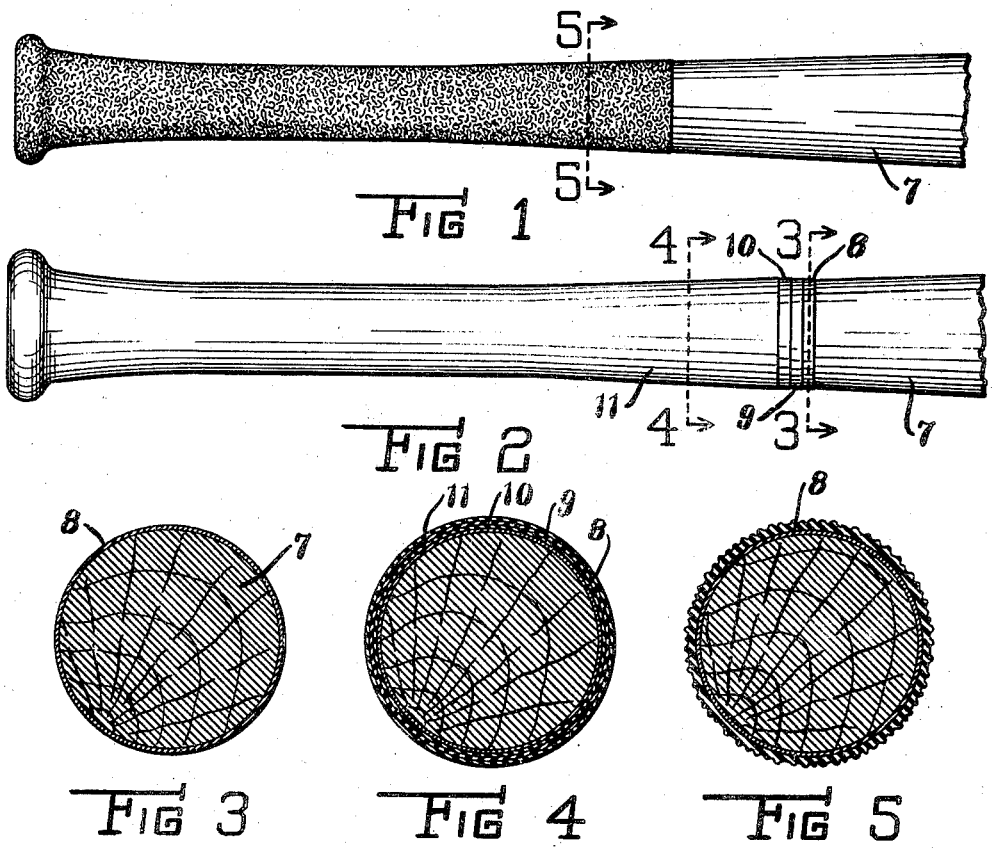
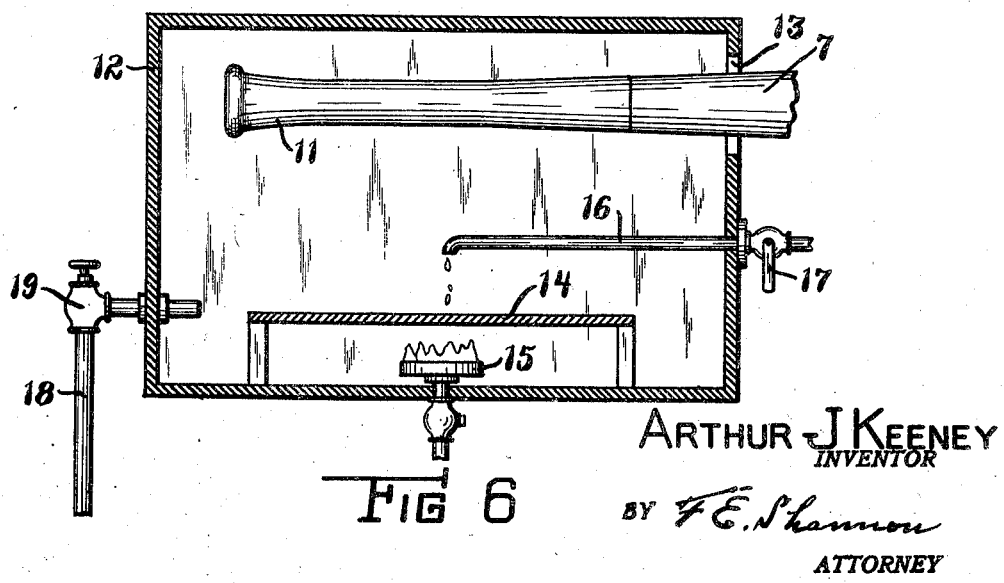
ARTHUR J KEENEY
INVENTOR
BY F.E. Shannon
ATTORNEY Patented Dec. 7, 1937

2,101,714

UNITED STATES PATENT OFFICE 2,101,714

RUBBER COATED ARTICLE AND METHOD OF MANUFACTURING SAME

Arthur J. Keeney, Cuyahoga Falls, Ohio

Application February 15, 1935, Serial No. 6,665

4 Claims. (Cl. 91—68)

This invention relates to the art of coating articles with rubber and is adapted to provide a rubber coating for a surface of any article composed of practically any material. The invention is adapted to provide a rubber coating or lining for containers or conduits for carrying acids or acid fumes and can be followed to provide a rubber coating for articles composed of wood, for example, table tennis racquets, the handles of golf clubs, base ball bats and other handles. The invention is illustrated in the drawing and herein described as applied to a base ball bat, but it is understood that it is not limited to this use.

Objects of the invention are to provide an improved method of coating articles or parts thereof with rubber which may be economically followed to provide an article having a rubber coated surface which will be securely and permanently held thereon.

Other objects are to provide an improved rubber coating having a fine, irregularly wrinkled surface which will be of attractive appearance and which will provide a non-slipping surface, which will not irritate the hands and will form an efficient handle grip.

Additional objects are to provide an impermeable rubber coating for articles which will exclude moisture or any liquid, gases or fumes therefrom and which will form a tough resisting surface adapted to cushion a shock and which will not be easily marred or otherwise injured.

The above objects are accomplished and additional ends are attained by the novel process of manufacture and the improved article herein described with reference to the accompanying drawing wherein there is illustrated a product constructed in accordance with this invention with one form of apparatus which may be employed for performing certain steps of the improved process herein described.

In the drawing:—

Figure 1 is a side elevational view of a portion of a base ball bat having a handle coated with rubber in accordance with this invention, Figure 2 is a similar view illustrating certain steps of the improved process herein described, Figure 3 is a cross sectional view taken as indicated by the lines 3—3 of Figure 2 and illustrating the first step of the improved process herein described.

Figure 4 is a cross sectional view illustrating one of the several steps of the process herein disclosed, the same being taken as indicated by the lines 4—4 of Figure 2, Figure 5 is a cross sectional view of an improved product constructed in accordance with this invention, the same being taken as indicated by the lines 5—5 of Figure 1, Figure 6 is a cross sectional view of the apparatus for curing the coated article.

The handle portion of the wooden bat 7 is first thoroughly cleaned. The clean portion is then dipped in lacquer, varnish or other coating material formed by dissolving a gum, resin or other suitable substance in a solvent of rubber and which is adapted to congeal into a firm, hard, lasting layer 8. When the coating 8 is partly congealed and is in a sticky, or tacky condition, the handle is dipped into a rubber solution to form the layer 9. The rubber solution employed is formed by dissolving rubber in a suitable solvent such as naphtha, benzol, etc., preferably a solvent of the solids employed in forming the coating 8. The layer 9 is permitted to congeal and like layers 10 and 11 may be likewise deposited until a coating of the desired thickness is formed.

In dipping the handle 8 in a rubber solution, I prefer to dip each succeeding layer to a different depth as shown in Figure 2 to form a tapered or stepped-off surface adjacent the edge of the coating thus formed.

The coating thus formed of the layers 8, 9, 10, and 11 is permitted to thoroughly dry or congeal and the same is then submitted to vulcanization.

In carrying out the invention, any suitable apparatus may be employed. In Figure 6 there is shown an oven 12 having an opening 13 through which the article may be introduced. The oven is provided at the bottom thereof with a plate 14 which is heated by the stove 15 or other suitable means.

The numeral 16 denotes the delivery end of a tube through which sulphur chlorid is introduced into the oven 12, a suitable valve 17 being employed to regulate the flow of the sulphur chlorid therethrough. The delivery end of the pipe 16 is positioned over the plate 14 whereby the sulphur chlorid will be delivered thereon and immediately changed into a vulcanizing vapor by the hot plate 14. The numeral 18 denotes a steam line through which steam is introduced into the oven 12. The stove 14 and the valve 19 in the steam line 18 are regulated to maintain a temperature in the oven at approximately 150° F. the exact temperature varying in accordance with the result desired. The article 7 is introduced through the opening 13 entirely positioning the coated area therein and the same is permitted to remain in the oven 12 from five to eight minutes in accordance with the coarseness of the grained surface desired.

The article is then removed and is immediately dipped in a solution of sulphur chlorid which is maintained at a temperature considerably lower than that created in the oven 12. The sulphur chlorid completes the cure and forms fine, closely spaced, irregular wrinkles over the exposed surface of the coating thus formed.

While I have shown particular means for heating the oven 12, it is understood that the coating may be subjected to heat by any form of apparatus in any desired manner and while I have specified sulphur chlorid as a curing agent, it is understood that any suitable curing agent may be employed if desired.

It will be seen that the coating 8 and the coating 9 being formed with the same or a similar solvent will intimately unite and that the coating 8 will firmly adhere to both the handle 7 and the layer 9. The successive layers 9, 10, and 11 become an integral part of the layer 9 thereby forming a rubber sheath which is in fact an integral part of the handle 7 and which cannot be removed therefrom without dissolving or melting the layer 8.

In using a dispersion of rubber such as liquid rubber latex, alcohol may be used with the latex to form the layers 9, 10, and 11 and the lacquer or other coating formed by dissolving gums, varnish or other suitable substance in alcohol, it being essential to secure the best results to provide a lacquer and a rubber coating which are formed by the same or a related solvent.

It will be understood that the term "rubber" employed in the specification and in the claims shall include synthetic rubber, rubber substitutes and other similar material and that the word "lacquer" as used in the specification and claims shall include varnish and any other suitable solution or dispersion of a similar character or any suitable liquid or material which will set to form a coating of the character herein described. While the various layers have been described as formed by dipping, it is understood that the same may be applied or formed in any suitable manner.

The process is particularly adapted for coating the interior surface of containers for holding acids or other liquids which cannot be successfully held in ordinary containers and may be followed to coat metal ventilator pipes and other pipes or conduits designed to carry liquids or vapors injurious to metal.

Having thus fully described a new product and disclosed a new process of manufacture, I claim:

1. That method of coating wood with rubber which consists of first applying a coating of lacquer to the wood, permitting the same to partly congeal, then adding a coating of rubber to the coating of lacquer while the same is in a partly congealed condition, subjecting the coating to heat and sulphur chloride fumes then simultaneously cooling and vulcanizing the coating.

2. That method of coating an article with rubber which consists in first applying a coating of lacquer, permitting the same to partly congeal; applying a coating of liquid rubber while the lacquer is in a partly congealed condition, submitting the rubber coating to heat and sulphur chlorid fumes, then subjecting the rubber coating to a relatively cold solution of sulphur-chlorid.

3. That method of coating an article with rubber which consists of first applying a coating of lacquer, permitting the same to partly congeal, applying a coating of liquid rubber while the lacquer is in a partly congealed condition; applying successive coating of liquid rubber until a rubber cover of the desired thickness is formed, submitting the rubber to heat, then suddenly cooling the outer portion of the rubber cover and submitting the same to vulcanization.

4. That method of coating an article with rubber which consists in first applying a base coating of lacquer, forming a solution of rubber and a solvent of said lacquer; applying a coating of said solution; applying successive coatings of liquid rubber until a rubber cover of the desired thickness has been built up thereon, then submitting the cover thus formed to heat to thoroughly heat the same, then submitting the same to the action of cold sulphur chloride.

ARTHUR J. KEENEY.